United States Patent
Chhatkuli et al.

(10) Patent No.: US 12,299,585 B1
(45) Date of Patent: May 13, 2025

(54) SELF-IMPLEMENTING ACCURATE BODY MEASUREMENTS BY A USER USING A MOBILE DEVICE

(71) Applicant: VISUALIZE KK, Tokyo (JP)

(72) Inventors: Subas Chhatkuli, Tokyo (JP); Bryan Atwood, Tokyo (JP); Jin Koh, Tokyo (JP)

(73) Assignee: VISUALIZE KK, Tokyo (JP)

( * ) Notice: Subject to any disclaimer, the term of this patent is extended or adjusted under 35 U.S.C. 154(b) by 0 days.

(21) Appl. No.: 19/021,982

(22) Filed: Jan. 15, 2025

(51) Int. Cl.
  G06N 3/091 (2023.01)
  G06N 3/0455 (2023.01)
  G06T 7/593 (2017.01)

(52) U.S. Cl.
  CPC ........... *G06N 3/091* (2023.01); *G06N 3/0455* (2023.01); *G06T 7/596* (2017.01)

(58) Field of Classification Search
  CPC ....... G06N 3/091; G06N 3/0455; G06T 7/596
  USPC ........................................................ 382/128
  See application file for complete search history.

(56) References Cited

U.S. PATENT DOCUMENTS

| | | | | |
|---|---|---|---|---|
| 10,706,262 | B2 * | 7/2020 | Makeev | G06F 18/24133 |
| 11,995,840 | B2 * | 5/2024 | Canepa | G06T 7/97 |
| 12,112,569 | B2 * | 10/2024 | Mahbub | G06V 10/764 |
| 12,125,582 | B2 * | 10/2024 | Bosanac | G06N 20/00 |
| 12,183,109 | B2 * | 12/2024 | Bai | G06V 40/10 |

FOREIGN PATENT DOCUMENTS

| | | | | |
|---|---|---|---|---|
| CN | 108986159 A | * | 12/2018 | G06T 17/00 |
| CN | 110648394 A | * | 1/2020 | G06N 3/0454 |

OTHER PUBLICATIONS

Chen, Ultraman: Single Image 3D Human Reconstruction with Ultra Speed and Detail arXiv Mar. 18, 2024 (Year: 2024).*

* cited by examiner

*Primary Examiner* — Juan A Torres
(74) *Attorney, Agent, or Firm* — Lando & Anastasi, LLP

(57) ABSTRACT

A method includes receiving from a camera a 2D front-view digital image (FDI) and side-view digital image (SDI) of a human body; receiving one or more camera parameters (CPs); executing a front depth-estimation model (DEM) generated through pre-training a first machine-learning model (MLM) to convert the FDI and SDI into a front depth map (DM) and side DM, respectively; executing a rear DEM generated through pre-training a second MLM to estimate a rear DM based on the FDI, SDI, and front and side DMs; combining the front and rear DMs to generate a 3D model; executing a front key-point (FKP) estimation model generated through pre-training a third MLM to estimate one or more FKPs; and extracting a body measurement based on the 3D model and FKPs, the first and second MLMs each including a respective encoder and decoder, each respective decoder configured to be executed based on the CPs.

20 Claims, 6 Drawing Sheets

SELF-IMPLEMENTING ACCURATE BODY MEASUREMENTS BY A USER USING A MOBILE DEVICE

BACKGROUND

Body measurements of a human being relating to surface contour or internal composition estimations may be needed for various reasons, such as garment fitting and health monitoring. A person may prefer the ability to accurately measure their own body through a self-implemented process without resorting to the help of another.

SUMMARY

Examples of the methods and systems discussed herein are not limited in application to the details of construction and the arrangement of components set forth in the following description or illustrated in the accompanying drawings. The methods and systems may be capable of implementation in other embodiments and of being practiced or of being carried out in various ways. Examples of specific implementations are provided herein for illustrative purposes and are not intended to be limiting. Acts, components, elements, and features discussed in connection with any one or more examples may be configured to operate and/or be implemented in a similar role in any other examples.

The phraseology and terminology used herein is for the purpose of description. References to examples, embodiments, components, elements, or acts of the systems and methods herein referred to in the singular may also embrace embodiments including a plurality. Similarly, references in plural to embodiments, components, elements, or acts may be implemented as a singularity. References in the singular or plural form may therefore not be intended to limit the presently disclosed systems or methods, their components, acts, or elements. The use herein of "including," "comprising," "having," "containing," "involving," and variations so forth, may encompass the items listed thereafter and equivalents thereof as well as additional items.

References to "or" may be construed as inclusive so that any terms described using "or" may indicate any of a single, more than one, and all of the described terms. For example, the phrase "at least one of A or B" may refer A and/or B—that is, A only, B only, or A and B together. In addition, in the event of inconsistent usages of terms between this document and documents incorporated herein by reference, the term usage in the incorporated documents is supplementary to this document. For irreconcilable differences, the term usage in this document controls.

According to at least one aspect of the present disclosure, in one example, at least one non-transitory computer-readable medium storing thereon sequences of computer-executable instructions for measuring a human body based on two-dimensional (2D) digital images is disclosed. The sequences of computer-executable instructions include instructions that instruct at least one processor to receive, from a camera, a 2D front-view digital image of the human body and a 2D side-view digital image of the human body; receive one or more camera parameters; execute a front depth-estimation model to convert the 2D front-view digital image into a front depth map and to convert the 2D side-view digital image into a side depth map, the front depth-estimation model generated through pre-training a first machine-learning model; execute a rear depth-estimation model to estimate a rear depth map based on the 2D front-view digital image, the 2D side-view digital image, the front depth map, and the side depth map, the rear depth-estimation model generated through pre-training a second machine-learning model; combine the front depth map with the rear depth map to generate a three-dimensional (3D) model of the human body; execute a front key-point estimation model to estimate one or more front key points of the human body in the 3D model, the front key-point estimation model generated through pre-training a third machine-learning model; and extract a measurement of the human body based on the 3D model and at least one of the one or more front key points, wherein the first machine-learning model includes a first encoder and a first decoder, the first decoder configured to be executed based on at least one of the one or more camera parameters, and the second machine-learning model includes a second encoder and a second decoder, the second decoder configured to be executed based on at least one of the one or more camera parameters.

In one example of the at least one non-transitory computer-readable medium, at least one of the 2D front-view digital image and the 2D side-view digital image is a Red-Green-Blue (RGB) image.

In another example of the at least one non-transitory computer-readable medium, at least one of the 2D front-view digital image and the 2D side-view digital image is a grayscale image.

In another example of the at least one non-transitory computer-readable medium, the one or more camera parameters include a focal length of the camera, a first plurality of camera orientation parameters associated with the 2D front-view digital image, and a second plurality of camera orientation parameters associated with the 2D side-view digital image. In one example of the at least one non-transitory computer-readable medium, the first decoder is configured to be executed based on the focal length of the camera and the first plurality of camera orientation parameters associated with the 2D front-view digital image; and the second decoder is configured to be executed based on the focal length of the camera, the first plurality of camera orientation parameters associated with the 2D front-view digital image, and the second plurality of camera orientation parameters associated with the 2D side-view digital image. In another example of the at least one non-transitory computer-readable medium, each plurality of the first plurality of camera orientation parameters and the second plurality of camera orientation parameters includes a first rotation angle with respect to a first axis in an image plane and a second rotation angle with respect to a second axis in the image plane, the second axis being perpendicular to the first axis.

In one example of the at least one non-transitory computer-readable medium, the instructions further instruct the at least one processor to control a user interface to provide the measurement of the human body to a user.

In another example of the at least one non-transitory computer-readable medium, the first encoder and the second encode are pre-trained based on a common backbone, the common backbone being one of a group including DenseNet, U-Net, V-Net, Pyramid Attention Network (PAN), DepthNet, and Vision Transformer (ViT).

In another example of the at least one non-transitory computer-readable medium, the third machine-learning model includes a third encoder, a global context module, and a plurality of key-point modules; and executing the front key-point estimation model to estimate the one or more front key points includes executing the third encoder to extract a global feature based on the 2D RGB front-view image, the global feature represented by a plurality of spatial dimensions, executing the global context module to convert the plurality of spatial dimensions of the global feature into a global feature vector, and executing one of the plurality of key-point modules to process the global feature vector to estimate a front key point. In one example of the at least one non-transitory computer-readable medium, the third encoder is pre-trained based on a MobileNet backbone. In one example of the at least one non-transitory computer-readable medium, the plurality of key-point modules includes at least one of a group including a Dilated Convolution module, a Squeeze-and-Excitation (SE) Block module, and a Global Pooling (Mean and Max) module. In one example of the at least one non-transitory computer-readable medium, the instructions further instruct the at least one processor to execute a side key-point estimation model to estimate one or more side key points of the human body in the 3D model, the side key-point estimation model generated through pre-training the third machine-learning model, wherein executing the side key-point estimation model includes executing the second encoder to extract a global feature based on the 2D side-view digital image, the global feature represented by a plurality of spatial dimensions, executing the global context module to convert the plurality of spatial dimensions of the global feature into a global feature vector, and executing one of the plurality of key-point modules to process the global feature vector to estimate a side key point.

In one example of the at least one non-transitory computer-readable medium, the measurement of the human body includes at least one of a group including a neck girth measurement, a waist girth measurement, a hip girth measurement, and a body composition measurement, the body composition measurement including a body fat measurement.

In another example of the at least one non-transitory computer-readable medium, the instructions further instruct the at least one processor to receive an external depth map corresponding to the 2D front-view digital image from a sensor; and in response to receiving the external depth map, update the front depth map through incorporating at least a portion of the external depth map into the front depth map.

In another example of the at least one non-transitory computer-readable medium, the camera is coupled to or a part of a mobile device, the mobile device including the at least one non-transitory computer-readable medium and the at least one processor.

According to at least another aspect of the present disclosure, in one example, at least one non-transitory computer-readable medium storing thereon sequences of computer-executable instructions for measuring a human body based on two-dimensional (2D) digital images is disclosed. The sequences of computer-executable instructions include instructions that instruct at least one processor to receive, from a camera, a 2D front-view digital image of the human body and a 2D side-view digital image of the human body; receive an external depth map corresponding to the 2D front-view digital image from a sensor; receive one or more camera parameters; execute a side depth-estimation model to convert the 2D side-view digital image into a side depth map, the side depth-estimation model generated through pre-training a first machine-learning model; execute a rear depth-estimation model to estimate a rear depth map based on the 2D front-view digital image, the 2D side-view digital image, the external depth map, and the side depth map, the rear depth-estimation model generated through pre-training a second machine-learning model; combine the external depth map and the rear depth map to generate a three-dimensional (3D) model of the human body; execute a front key-point estimation model to estimate one or more front key points of the human body in the 3D model, the front key-point estimation model generated through pre-training a third machine-learning model; and extract a measurement of the human body based on the 3D model and at least one of the one or more front key points, wherein the first machine-learning model includes a first encoder and a first decoder, the first decoder configured to be executed based on the one or more camera parameters, and the second machine-learning model includes a second encoder and a second decoder, the second decoder configured to be executed based on the one or more camera parameters.

In one example of the at least one non-transitory computer-readable medium, the one or more camera parameters include a focal length of the camera, a first plurality of camera orientation parameters associated with the 2D front-view digital image, and a second plurality of camera orientation parameters associated with the 2D side-view digital image; the first decoder is configured to be executed based on the focal length of the camera and the first plurality of camera orientation parameters associated with the 2D front-view digital image; and the second decoder is configured to be executed based on the focal length of the camera, the first plurality of camera orientation parameters associated with the 2D front-view digital image, and the second plurality of camera orientation parameters associated with the 2D side-view digital image.

In another example of the at least one non-transitory computer-readable medium, the camera and the sensor are coupled to or parts of a mobile device, the mobile device including the at least one non-transitory computer-readable medium and the at least one processor.

According to at least another aspect of the present disclosure, in one example, a method of measuring a human body based on two-dimensional (2D) digital images is disclosed. The method includes receiving, from a camera, a 2D front-view digital image of the human body and a 2D side-view digital image of the human body; receiving one or more camera parameters; executing a front depth-estimation model to convert the 2D front-view digital image into a front depth map and to convert the 2D side-view digital image into a side depth map, the front depth-estimation model generated through pre-training a first machine-learning model; executing a rear depth-estimation model to estimate a rear depth map based on the 2D front-view digital image, the 2D side-view digital image, the front depth map, and the side depth map, the rear depth-estimation model generated through pre-training a second machine-learning model; combining the front depth map with the rear depth map to generate a three-dimensional (3D) model of the human body; executing a front key-point estimation model to estimate one or more front key points of the human body in the 3D model, the front key-point estimation model generated through pre-training a third machine-learning model; and extracting a measurement of the human body based on the 3D model and at least one of the one or more front key points, wherein the first machine-learning model includes a first encoder and a first decoder, the first decoder configured to be executed based on the one or more camera parameters, and the second machine-learning model includes a second encoder and a second decoder, the second decoder configured to be executed based on the one or more camera parameters.

In one example of the method, the one or more camera parameters include a focal length of the camera, a first plurality of camera orientation parameters associated with the 2D front-view digital image, and a second plurality of camera orientation parameters associated with the 2D side-view digital image; the first decoder is configured to be executed based on the focal length of the camera and the first plurality of camera orientation parameters associated with the 2D front-view digital image; and the second decoder is configured to be executed based on the focal length of the camera, the first plurality of camera orientation parameters associated with the 2D front-view digital image, and the second plurality of camera orientation parameters associated with the 2D side-view digital image.

BRIEF DESCRIPTION OF THE DRAWINGS

Various aspects of at least one embodiment are discussed below with reference to the accompanying figures, which may not be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain the principles and operations of the described and claimed aspects and embodiments. In the figures, each identical or substantially similar component that is illustrated in various figures may be represented by a like numeral. For purposes of clarity, not every component may be labeled in every figure. In the figures:

DETAILED DESCRIPTION

A person may need to accurately measure his or her own body contour and/or composition through a self-implemented straightforward process without the need for assistance by another or resorting to expensive equipment. For example, a person may desire to self-perform accurate body measurements at home and at a time of personal convenience without having to go to a tailor's shop or a health provider location to obtain professional services for the body measurements.

Significant barriers have so far prevented ordinary people from accessing accurate and simplified self-implemented body measurements. These barriers include expensive professional body scanning equipment, such as Bod Pods, complex measurement processes requiring specialized training, such as the US Navy method based on physical measurements, and invasive and time-consuming techniques, such as dual X-ray absorptiometry (DEXA) scans. Generally, many body measurement approaches are insufficient for regular or random self-measurement purposes due to the high costs of professional measurement services (for example, a tape measurement by a professional tailor), the requirement of specialized facilities, the need for human expert intervention, inconsistent measurement accuracies, the lack of privacy and personal convenience, or the limited accessibility for average individuals.

Existing machine-learning camera measurement systems, such as Bodygram and Bodymapp, may also be insufficient due to their requirements of mandatory image poses, such as T-pose or A-pose, visibility of the entire body in the images, specific lighting conditions, and complex positioning instructions, which may lead to poor user experience and limited accuracy due to pose constraint, body variation, and simplified two-dimensional (2D) to three-dimensional (3D) conversion techniques. Besides, these systems may require transmitting body measurement data to external data processing equipment not controlled by the user, which invokes personal privacy risks.

Aspects of the current disclosure include a user-friendly, privacy-preserving, and scientifically accurate self-implemented method of obtaining comprehensive body measurements using a mobile device, such as a smartphone or a tablet device, readily accessible to ordinary users.

Figure 1:
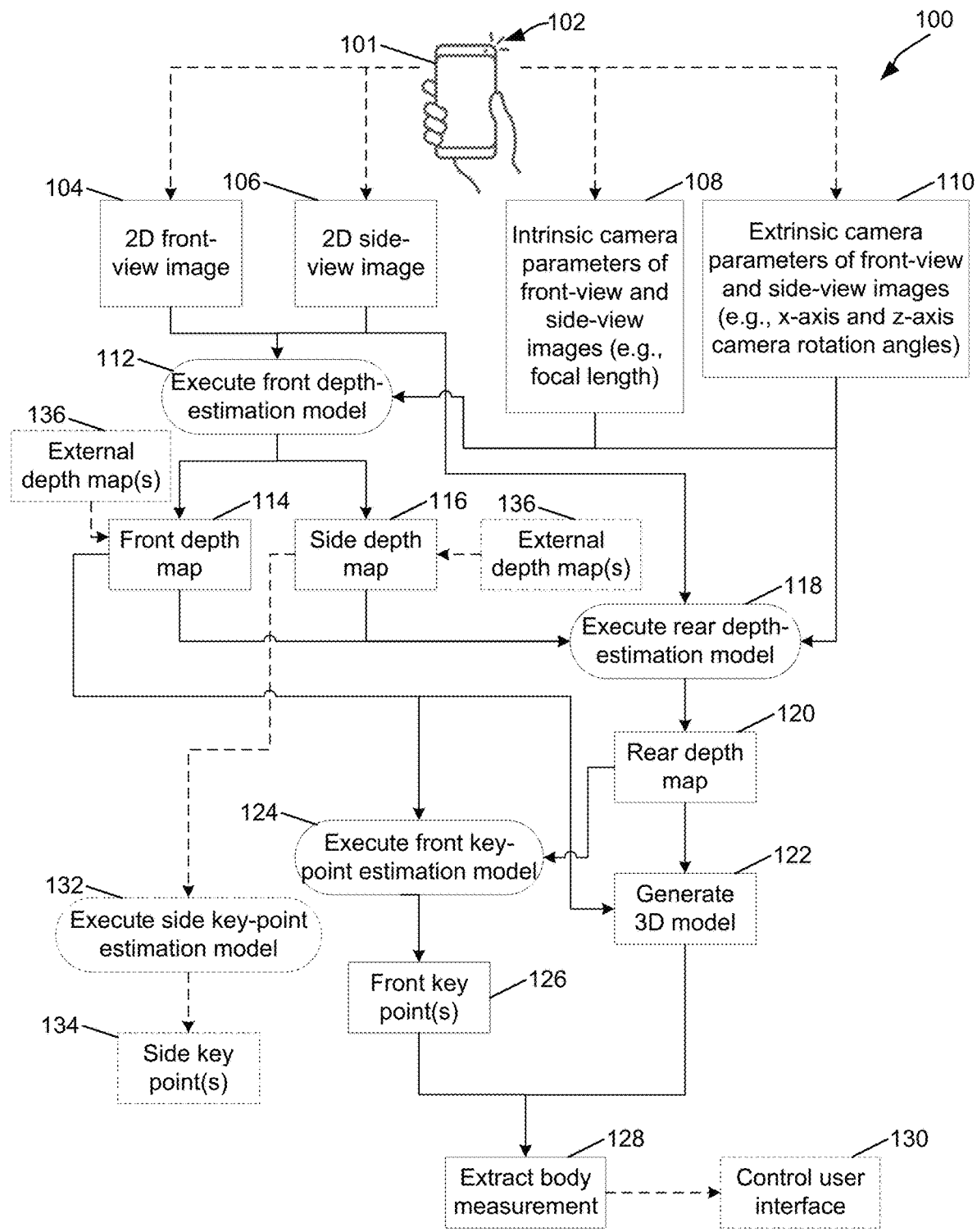
FIG. 1 illustrates a process for self-implementing accurate body measurements by a user using a mobile device according to an example.

FIG. 1 illustrates a process 100 for self-implementing accurate body measurements by a user using a mobile device 101 according to an example. Certain acts of the process 100 are described as occurring in sequence solely for purposes of explanation rather than limitation. In many implementations, certain acts of the process 100 may be executed in different orders and/or in parallel with one another. Accordingly, no limitation is implied by the order of acts in the process 100. The process 100 may be self-implemented by the user through a controller 202 (see FIG. 2) of the mobile device 101. In various examples, the mobile device 101 may be a smartphone, a tablet device, a PDA, a smartwatch, a laptop computer, or other types of portable computing devices.

In one example, a block 104 depicts a 2D front-view image ("2D front-view image 104") of a first portion of a user's body acquired by the user using a camera 102. In certain examples, the first portion of the user's body may include a portion from a neck region of the user body to a waist region of the user body. In other examples, the first portion may include another portion of the user's body different from the neck-to-waist portion. The first portion of the user's body may not include the entire body of the user. A particular body pose (for example, a T-pose or A-pose) or lighting condition may not be needed for the 2D front-view image 104. In various examples, the camera 102 may be a digital camera and the 2D front-view image 104 may be a digital image, such as a Red-Green-Blue (RGB) or grayscale image. In certain examples, the background of the 2D front-view image 104 may be removed. In one example, the background of the 2D front-view image 104 may be removed using a deep neural network. In some examples, the camera 102 is a part of the mobile device 101, such as a front-facing built-in camera with a selfie mode. In other examples, the camera 102 is coupled to the mobile device 101 as an external device 210 (see FIG. 2). In one example, the camera 102 may include multiple cameras collectively usable to capture a single 2D image. In other examples, the camera 102 may be a single camera. In one example, the 2D front-view image is captured in a selfie mode by the user when the front side of the user's body is generally facing the camera 102 without conforming to a pre-determined precise shot angle.

Similarly, in one example, a block 106 depicts a 2D side-view image ("2D side-view image 106") of a second portion of the user's body acquired by the user using the camera 102. In certain examples, the second portion of the user's body may overlap with, include, or be a part of, the first portion of the user's body. For example, the second portion of the user's body may include a portion from above the waist region to the hip region. The second portion of the user's body may not include the entire body of the user. A particular body pose (for example, a T-pose or A-pose) or lighting condition may not be needed for the 2D side-view image 106. In certain examples, the background of the 2D side-view image 106 may be removed. In one example, the background of the 2D side-view image 106 may be removed using a deep neural network. As described above, in some examples, the camera 102 may include one or more digital cameras and the 2D side-view image 106 may be a digital image, such as an RGB or grayscale image. In one example, the 2D side-view image 106 may be captured in a selfie mode by the user when the left- or right-hand side of the user's body is generally facing the camera 102 without conforming to a pre-determined precise shot angle. In various examples, the camera 102 is coupled to, or a part of, the mobile device 101.

In certain examples, the 2D front-view image 104 and the 2D side-view image 106 may be respectively captured with different cameras (not illustrated) that the mobile device can access.

In one example, a block 108 depicts one or more intrinsic camera parameters ("intrinsic camera parameters 108") associated with the 2D front-view image 104 or the 2D side-view image 106. In certain examples, the intrinsic camera parameters 108 may be recorded in a memory 206 (see FIG. 2) of the mobile device 101. The intrinsic camera parameters 108 may include a focal length and/or optical center location of the camera 102 when capturing the respective front-view or side-view image.

In one example, a block 110 depicts one or more extrinsic camera parameters ("extrinsic camera parameters 110") associated with the 2D front-view image 104 or the 2D side-view image 106. In certain examples, the extrinsic camera parameters 110 may be recorded in the memory 206 of the mobile device 101. The extrinsic camera parameters 110 may include orientation information of the camera 102 when capturing the respective front-view or side-view image. In one example, the orientation information may include one or two rotational angles of an actual image plane of the camera 102 relative to an ideal image plane in substantial parallel with the camera-facing portion of the user's body in the respective image. For example, if rotations about a y-axis are within the actual image plane, rotational angles of the actual image plane about an x-axis and/or a z-axis relative to the actual image plane may be recorded, with x-axis, y-axis, and z-axis being perpendicular axes of a 3D Cartesian coordinate system.

At act 112, in one example, a controller 202 (see FIG. 2) of the mobile device 101 receives the 2D front-view image 104, the 2D side-view image 106, the one or more intrinsic camera parameters 108, and the one or more extrinsic camera parameters 110 to execute a machine-learning front depth-estimation model 220 (see FIG. 2) to convert the 2D front-view image 104 into a front depth map 114 and convert the 2D side-view image 106 into a side depth map 116. In one example, the controller 202 may execute the front depth-estimation model 220 to convert the 2D front-view image 104 into a front depth map 114 based on the 2D front-view image 104 and one or more camera parameters 216 (see FIG. 2), that is, one or more intrinsic camera parameters 108 and/or one or more extrinsic camera parameters 110, associated with the 2D front-view image 104. At the act 112, the controller 202 may also execute the front depth-estimation model 220 to convert the 2D side-view image 106 into a side depth map 116 based on the 2D side-view image 106 and one or more camera parameters 216 associated with the 2D side-view image 106. In other examples, the controller 202 may execute a different machine-learning model than the front depth-estimation model 220, such as a side-depth estimation model (not illustrated), to convert the 2D side-view image 106 into the side depth map 116.

In certain examples, the front depth-estimation model 220 may include a first encoder-decoder-based machine-learning model pre-trained on a large number of front-view and side-view images of human bodies as well as corresponding intrinsic and extrinsic camera parameters. For example, the front depth-estimation model 220 may include a DenseDepth algorithm having an encoder configured for feature extraction from 2D front-view or side-view images and a decoder configured for depth map generations based on one or more camera parameters. Training and executing the front depth-estimation model 220 is described in more detail below with respect to FIG. 3. Either of the converted front depth map 114 and side depth map 116 may include a 2D or 3D mesh.

At act 118, in one example, the controller 202 may execute a machine-learning rear depth-estimation model 222 (see FIG. 2) based on the 2D front-view image 104, the 2D side-view image 106, the front depth map 114, the side depth map 116, and one or more camera parameters 216 to generate a rear depth map 120 without requiring a 2D rear-view image of the user's body. The elimination of the need for a rear-view image may allow the user to execute the process 100 without resorting to the help of another person. The rear depth-estimation model 222 may include a second encoder-decoder-based machine-learning model pre-trained on a large number of front-view and side-view images of human bodies as well as corresponding one or more intrinsic and extrinsic camera parameters, as described in more detail below with respect to FIG. 4.

At act 122, in one example, the controller 202 may combine the previously generated front depth-estimation model 220 and the rear depth-estimation model 222 into a complete 2D model (not illustrated) and transpose the complete 2D model to generate a 3D model 226 (see FIG. 2) of the user's body using transformation methods such as a pinhole camera function transformation. In certain examples, the 3D model 226 may include a 3D mesh.

At act 124, in one example, the controller 202 may execute a machine-learning front key-point estimation model 224 (see FIG. 2) based on the front depth map 114 and/or the rear depth map 120 to identify one or more 2D front key points in the depth maps 114, 120. The front key-point estimation model 224 may include a third machine-learning model pre-trained on a large number of front-view and side-view images of human bodies, as described in more detail below with respect to FIG. 5. In certain examples, at the act 124, the 2D front key points in the depth maps 114, 120 may then be transposed to front key points 126 in the 3D model using transformation methods, such as a pinhole camera function transformation, to be used as one or more reference points for subsequent body measurement.

In one example, a single front key point 126 corresponding to the user's belly button may be identified by executing the front key-point estimation model 224 based on the front depth map 114 and subsequently transposed and used for measuring the user's waist girth. In some examples, a single front key point 126 may be identified directly based on the 2D front-view image 104. In another example, a pair of identified front key points 126 may correspond to the location of a bone joint of the user's body, such as a shoulder or hip joint. The pair may include a first front key point 126a projected on the front depth map 114 and a second front key point 126b projected on the rear depth map 120. A reference point may be obtained by locating a midpoint inside the body mesh of the 3D model between the first front key point 126a and the second front key point 126b.

At act 128, in one example, the controller 202 may perform one or more body measurements based on the previously generated 3D model 226 of the user's body and the identified one or more front key points 126 transposed into the 3D model 226. For example, the controller 202 may create a measuring plane perpendicular to the body height direction, which extends through a front key point 126 and intersects the body mesh of the 3D model 226. A body contour or girth measurement may therefore be obtained by measuring the outer circumference of the intersection region. In another example, the controller 202 may use the U.S. Navy method of measuring girths in relation to the location of body joints referenced by the front key point(s) 126. The body contour measurement may include a neck girth measurement, a waist girth measurement, and/or a hip girth measurement. In one example, the body contour measurement may be used to estimate a body composition. For example, the controller 202 may perform a body fat estimation based on the body contour measurement using various estimation methods, such as the U.S. Navy formula.

In some examples, the process 100 may include an act 130 to output the extracted body measurement to the user. At the act 130, in one example, the controller 202 controls a user interface 204 (see FIG. 2) of the mobile device 101 to output the body measurement, as described in more detail below with respect to FIG. 6.

In certain examples, the process 100 may include an act 132 to generate one or more side key points 134. At the act 132, in one example, the controller 202 may execute a machine-learning side key-point estimation model 228 (see FIG. 2) based on the side depth map 116 to generate the one or more side key points 134. The one or more side key points may be used as one or more reference points to guide the user in taking another 2D side-view image 106a (not illustrated) properly (for example, with the right pose) for re-executing the process 100. In one example, the side key-point estimation model 228 may be similar to the front key-point estimation model 224. In some examples, the side key-point estimation model 228 may include a fourth machine-learning model pre-trained on a large number of side-view images of human bodies. In certain examples, at the act 132, the controller 202 may execute the side key-point estimation model 228 to identify one or more 2D side key points in the depth maps 114, 120, which may then be transposed to side key points 134 in the 3D model using transformation methods, such as a pinhole camera function transformation.

In various examples, the process 100 may leverage one or more external depth maps 136 to optimize or replace the front depth map 114 and/or the side depth map 116. In one example, the controller 202 may receive a first external depth map 136 corresponding to the 2D front-view image 104 from a sensor 218 (see FIG. 2). The sensor 218 may be a part of the mobile device 101 or coupled to the mobile device 101 as an external device 210. In some examples, the sensor 218 may include one or more sensors to record the first external depth map 136. In one example, the sensor 218 may include a Light Detection and Ranging (LiDAR) sensor. In one example, the first external depth map 136 is captured in a selfie mode by the user when the front side of the user's body is generally facing the sensor 218 without requiring a pre-determined precise sensing angle. In one example, the first external depth map 136 is a TrueDepth map.

In one example, at the act 112, after the front depth map 114 is converted from the 2D front-view image 104 by executing the front depth-estimation model 220, the controller 202 may update the front depth map 114 by incorporating at least a portion of the external depth map 136 into the front depth map 114 to potentially improve the accuracy of the front depth map 114. To update the front depth map 114, the controller 202 may compare the depth values between the converted front depth map 114 and the external depth map 136 pixel by pixel, select the areas where the external depth map 136 has more precise texture details, and merge the more precise details into the front depth map 114. In certain examples, the controller 202 may not convert the 2D front-view image 104 into a front depth map 114 at the act 112 or may not use the converted front depth map 114 at the following acts, such as acts 118, 122, and 124. Instead, the controller 202 may directly use (not illustrated) the external depth map 136 received from the sensor 218 as the front depth map 114 in the following acts.

In other examples, the controller 202 may receive a second external depth map 136 corresponding to the 2D side-view image 106 from the sensor 218. The controller 202 may update the side depth map 116 by incorporating at least a portion of the second external depth map 136 into the side depth map 116 to potentially improve the accuracy of the side depth map 116. To update the side depth map 116, the controller 202 may compare the depth values between the converted side depth map 116 and the second external depth map 136 pixel by pixel, select the areas where the second external depth map 136 has more precise texture details, and merge the more precise details into the side depth map 116. In certain examples, the controller 202 may not convert the 2D side-view image 106 into a side depth map 116 at the act 112 or may not use the converted side depth map 116 at the following acts, such as acts 118, 122, and 124. Instead, the controller 202 may directly use (not illustrated) the second external depth map 136 received from the sensor 218 as the side depth map 116 in the following acts.

In certain examples, the process 100 may not include the 2D side-view image 106 for extracting accurate body measurements and only rely on the 2D front-view image 104 and the one or more camera parameters 216 associated with the 2D front-view image 104. In these examples, the process 100 may only generate one depth map, that is, the front depth map 114. In other examples, the process 100 may include additional 2D images of the user's body besides the 2D front-view image 104 and the 2D side-view image 106 for accurate body measurements. In some examples, the additional 2D images may be processed by the front depth-estimation model 220 at the act 112 to generate the front depth map 114 and/or side depth map 116. In some examples, the additional 2D images may be processed by the rear depth-estimation model 222 at the act 118 to generate the rear depth map 120.

In certain examples, the process 100 may not include one or both of the front key-point estimation model 224 and the side key-point estimation model 228. In these examples, the controller 202 may, at the act 128, extract a body measurement by identifying certain features on the texture of the mesh in the 3D model 226 or deducing measurement locations by the shape of the mesh.

Figure 2:
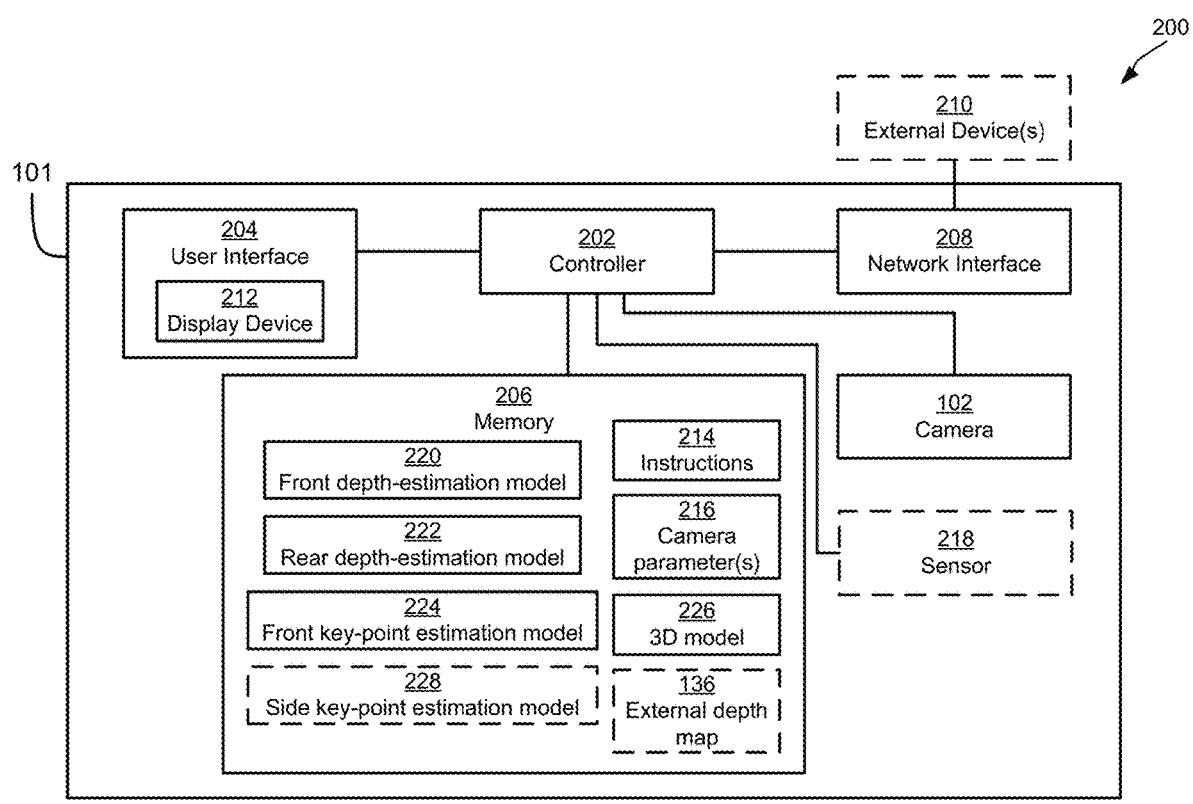
FIG. 2 illustrates a block diagram of the mobile device of FIG. 1 according to an example.

As described above, in various examples, the process 100 may be executed by the user on a mobile device 101. FIG. 2 illustrates a block diagram 200 of the mobile device 101 according to an example. The mobile device 101 includes at least one controller 202 ("controller 202"), at least one user interface 204 ("user interface 204"), memory and/or storage 206 ("memory 206"), at least one network interface 208 ("network interface 208"), and at least one camera 102. In some examples, the mobile device 101 may include at least one sensor 218. In some examples, the mobile device 101 may be coupled to one or more external devices 210 ("external devices 210") via the network interface 208. In other examples, the mobile device 101 may not be coupled to any external devices 210 and the process 100 may be executed completely locally within the mobile device 101 to protect the privacy of the user.

In one example, the memory 206 may include instructions 214 which may instruct at least one processor of the controller 202 to execute the process 100. The memory 206 may also include one or more camera parameters 216 (which may include one or more intrinsic camera parameters 108 and/or extrinsic camera parameters 110), the front-depth estimation model 220, the rear depth-estimation model 222, the front key-point estimation model 224, and the 3D model 226. In some examples, the memory 206 may include the side key-point estimation model 228 and/or the external depth map 136. The memory 206 may also include an operating system (not illustrated) such as an Android or iOS platform, other software (not illustrated), images 104, 106, converted depth maps 114, 116, 120, and identified key-points 126, 134.

In some examples, the mobile device 101 may be communicatively coupled to the internet (not illustrated) through the network interface 208. In one example, the controller 202 may download, upload, or update the instructions 214, any of the machine-learning models 220, 222, 224, 228, and other related information via the internet. In one example, the controller 202 may disable the network interface 208 to disconnect the mobile device 101 from the internet and the external devices 210 during the execution of the process 100 to prevent body measurement information from being transmitted externally.

In various examples, the controller 202 may construct, optimize, and/or execute one or more of the machine-learning models 220, 222, 224, 228 to extract a body measurement based on information stored in the memory 206, and/or based on information received from the external devices 210, and display the clinical predictions on the user interface 204. For example, the user interface 204 may include a display device 212 (for example, a computer monitor, laptop display, smartphone display, or other such displays) to display information related to the body measurement. Accordingly, references to the user interface 204 displaying information may include the display device 212 displaying information. A user may also input information via the user interface 204, such as the user's age, sex, personal goals, and other personal information. The controller 202 may recognize the personal information and sometimes automatically calculate a body metric, such as body fat composition, of the user based on the extracted body contour measurements.

Figure 3:
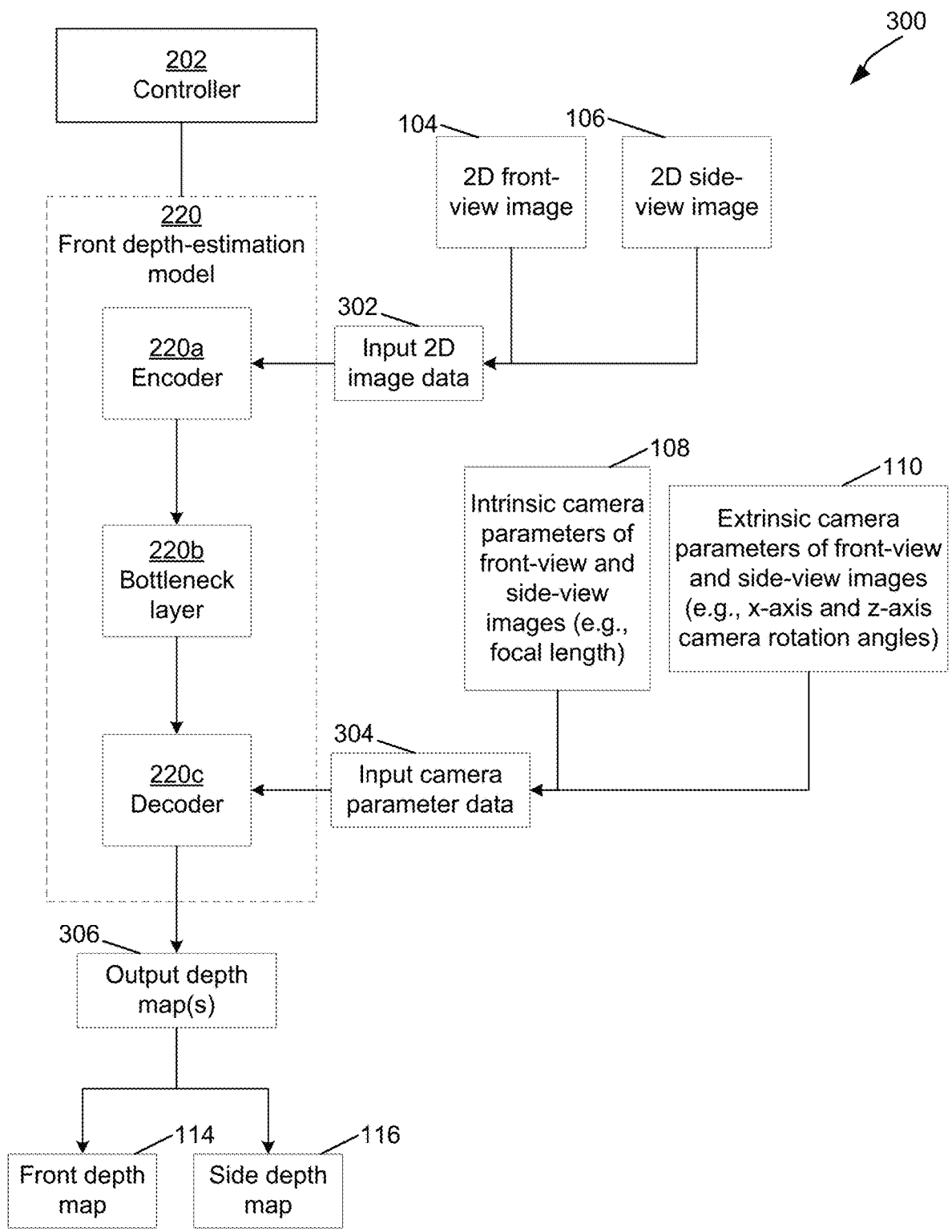
FIG. 3 illustrates a process to execute a front depth-estimation model to convert a 2D front-view image into a front depth map and convert a 2D side-view image into a side depth map according to an example.

FIG. 3 illustrates a process 300 (the act 112) to execute the front depth-estimation model 220 to convert the 2D front-view image 104 into the front depth map 114 and convert the 2D side-view image 106 into the side depth map 116 according to an example. The front depth-estimation model 220 may be a first machine-learning model having an encoder-decoder architecture and including a first encoder 220a, a first bottleneck layer 220b, and a first decoder 220c. The front depth-estimation model 220 may include a skip connection module (not illustrated). The first encoder 220a may be configured to extract hierarchical features from 2D images. In one example, the first encoder 220a may use a pre-trained DenseNet-169 machine-learning model as the backbone, and the encoder class may iterate through DenseNet-169's feature layers to generate multi-scale feature representations. The first decoder 220c may be configured to reconstruct depth information from encoded features. The first decoder 220c may incorporate additional contextual information, such as focal length and camera orientation, into the reconstruction and may use upsampling and convolution layers to progressively increase spatial resolution.

In one example, the act 112 may include sub-acts 302, 304, and 306. At the sub-act 302, in one example, the controller 202 may input the received 2D image data including the 2D front-view image 104 and the 2D side-view image 106 into the first encoder 220a to execute the first encoder 220a for feature extraction. In one example, the 2D images 104, 106 are RGB images with the three color parameters occupying three respective input channels. In other examples, the 2D images 104, 106 may be grayscale images.

At the sub-act 304, in one example, the controller 202 may input the received camera parameter data including one or more intrinsic camera parameters 108 and/or one or more extrinsic camera parameters 110 associated with the 2D images 104, 106 into the first decoder 220c to execute the first decoder 220c for contextual generation of depth information. In one example, the input camera parameter data includes a focal length (intrinsic) for both 2D images 104, 106 and x-axis and z-axis rotational angles (extrinsic) of the camera image plane associated with the respective 2D images 104, 106. The focal length and the rotational angles may occupy three respective input channels. For example, the focal length and the camera rotational angles may be interpolated by the first decoder 220c to match the feature map size and concatenated by the first decoder 220c with the bottleneck features at the start of the decoding process. In another example, the 2D front-view image 104 and the 2D side-view image 106 may have different focal lengths as input intrinsic camera parameters. At the sub-act 306, by executing the front depth-estimation model 220, the controller 202 outputs the front depth map 114 converted from the 2D front-view image and outputs the side depth map 116 converted from the 2D side-view image 106.

In one example, the front depth-estimation model 220 may be pre-trained using an Adam optimizer, a learning rate of 0.000005, 100 training epochs, a batch size of 6, and a training dataset split into a 70% portion for training and a 30% portion for testing. Scale-Invariant Logarithmic Loss (SILog) may be used as the loss function. The regularization of the front depth-estimation model 220 may use pre-trained DenseNet-169 weights and normalized data and may interpolate the depth maps to reduce computational overhead. In other examples, a different training technique or a different set of training parameters may be used. In various examples, the pre-training may be performed on the mobile device 101 or an external device 210, although, in operation, the front depth-estimation model 220 may be executed completely locally on the mobile device 101.

Figure 4:
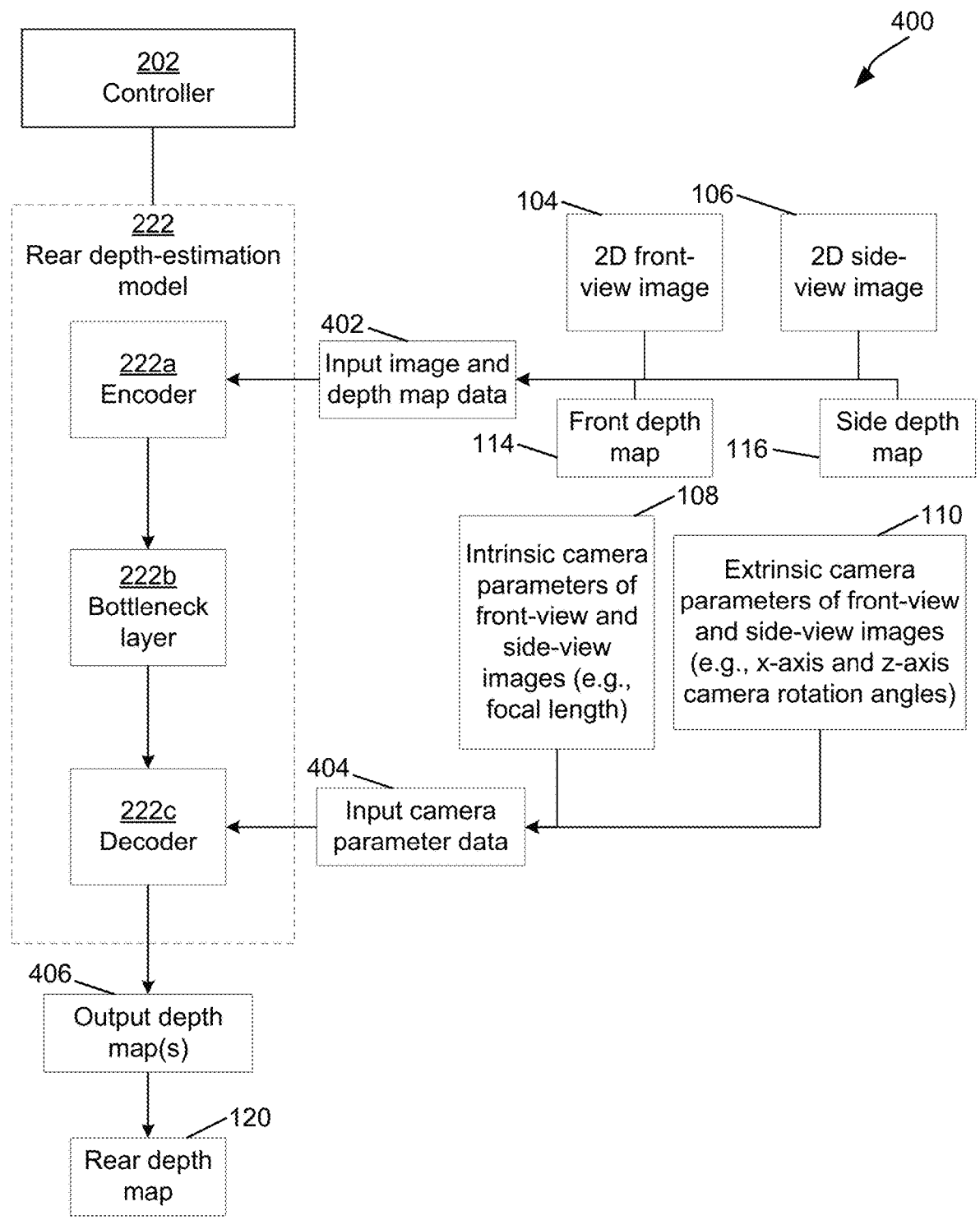
FIG. 4 illustrates a process to execute a rear depth-estimation model to generate a rear depth map without needing a 2D rear-view image of the user's body according to an example.

FIG. 4 illustrates a process 400 (the act 118) to execute the rear depth-estimation model 222 to generate the rear depth map 120 without needing a 2D rear-view image of the user's body according to an example. The rear depth-estimation model 222 may be a second machine-learning model having an encoder-decoder architecture and including a second encoder 222a, a second bottleneck layer 22sb, and a second decoder 222c. The rear depth-estimation model 222 may include a skip connection module (not illustrated). The second encoder 222a may be configured to extract hierarchical features from 2D images and depth maps. In one example, the second encoder 222a may use a pre-trained DenseNet-169 machine-learning model as the backbone, and the encoder class may iterate through DenseNet-169's feature layers to generate multi-scale feature representations. The second decoder 222c may be configured to reconstruct depth information from encoded features. The second decoder 222c may incorporate additional contextual information, such as focal length and camera orientation, into the reconstruction and may use upsampling and convolution layers to progressively increase spatial resolution.

In one example, the act 118 may include sub-acts 402, 404, and 406. At the sub-act 402, in one example, the controller 202 may input the received 2D image data including the 2D front-view image 104 and the 2D side-view image 106 as well as the converted depth maps 114, 116 into the first encoder 220a to execute the first encoder 220a for feature extraction. In one example, the 2D images 104, 106 are RGB images with the three color parameters occupying three respective input channels. The front depth map 114 and the side depth map 116 may take up another two input channels, resulting in more complex feature fusion at the second bottleneck layer than that at the first bottleneck layer of the front depth-estimation model 220. In other examples, the 2D images 104, 106 may be grayscale images.

At the sub-act 404, in one example, the controller 202 may input the received camera parameter data including one or more intrinsic camera parameters 108 and/or one or more extrinsic camera parameters 110 associated with the 2D images 104, 106 into the second decoder 222c to execute the second decoder 222c for contextual generation of depth information. In one example, the input camera parameter data includes a focal length for both 2D images 104, 106 and x-axis and z-axis rotational angles of the camera image plane associated with the respective 2D images 104, 106. The focal length and the rotational angles may occupy three respective input channels. For example, the focal length and the camera rotational angles may be interpolated by the second decoder 222c to match the feature map size and concatenated by the second decoder 222c with the bottleneck features at the start of the decoding process. At the sub-act 406, by executing the rear depth-estimation model 222, the controller 202 outputs the rear depth map 120.

Figure 5:
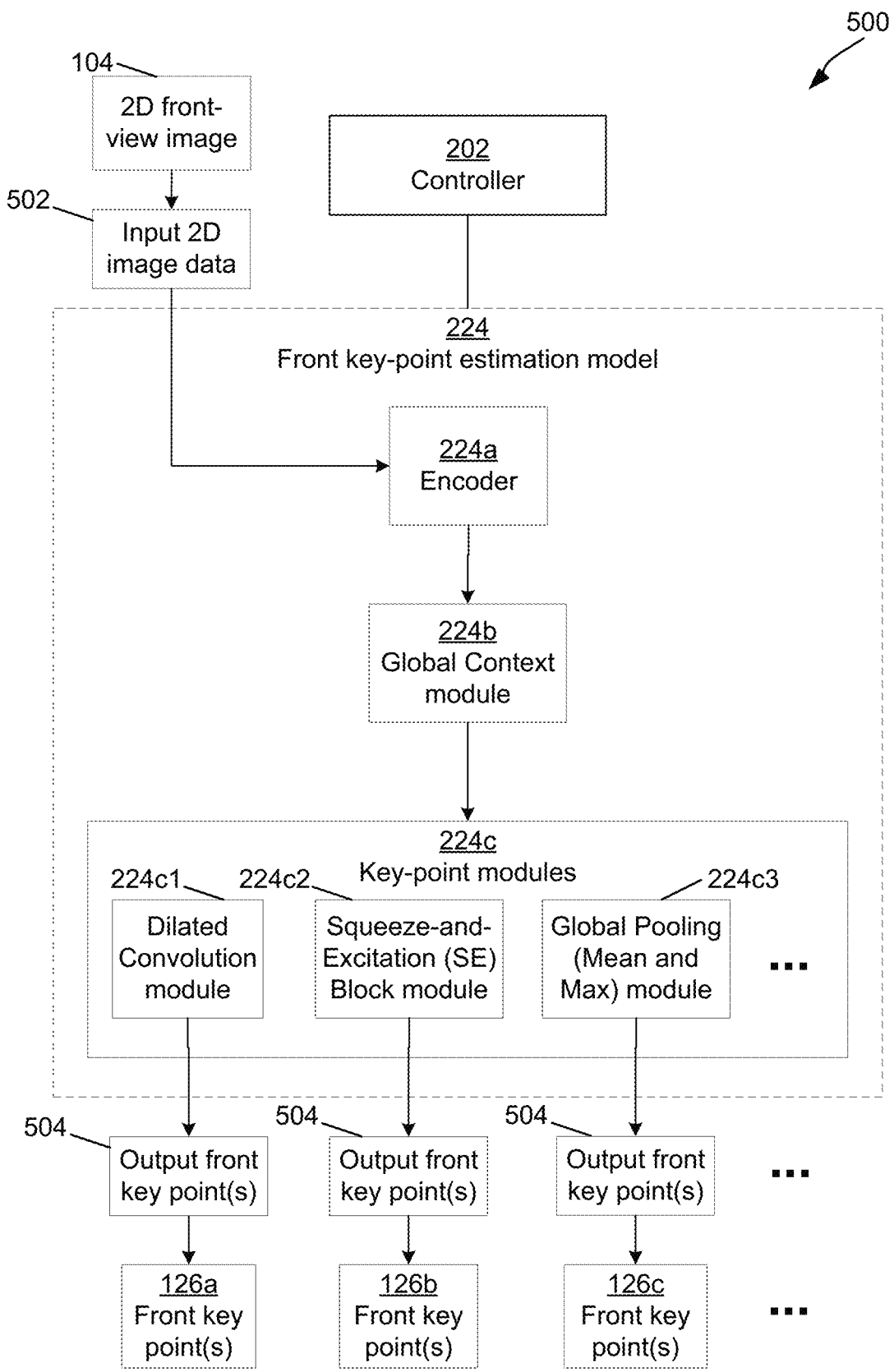
FIG. 5 illustrates a process to execute a front key-point estimation model to generate one or more front key points in a 3D model as one or more reference points for extracting body measurement according to an example.

In one example, the rear depth-estimation model 222 may be pre-trained using an Adam optimizer, a learning rate of 0.000005, 100 training epochs, a batch size of 6, and a training dataset split into a 70% portion for training and a 30% portion for testing. SmoothL1Loss with scaling may be used as the loss function. The regularization of the rear depth-estimation model 222 may use pre-trained DenseNet-169 weights and normalized data and may interpolate the depth maps to reduce computational overhead. In other examples, a different training technique or a different set of training parameters may be used. In various examples, the pre-training may be performed on the mobile device 101 or an external device 210, although, in operation, the front depth-estimation model 222 may be executed completely locally on the mobile device 101. FIG. 5 illustrates a process 500 (the act 124) to execute the front key-point estimation model 224 to generate one or more front key points 126 in the 3D model 226 as one or more reference points for extracting the body measurement according to an example. The front key-point estimation model 224 may include a third encoder 224a, a global context module 224b, and multiple key-point modules 224c. In one example, the third encoder 224a may use a pre-trained MobileNetV3 Small model as the backbone to extract global features from the input 2D images. These global features may provide a robust representation of the input 2D images, benefiting from the pre-trained model's understanding of general visual patterns. The Global Context Module 224b may have a global average pooling (GAP) layer which reduces spatial dimensions of a global feature to a single global feature vector. The feature vector may then pass through a fully connected network in the Global Context Module 224b to further condense the feature information and make it suitable for downstream tasks.

The key-point modules 224c may include multiple independent key-point modules. In one example, the key-point modules 224c may include a Dilated Convolution module 224c1, a Squeeze-and-Excitation (SE) Block module 224c2, a Global Pooling (Mean and Max) module 224c3, and others. The Dilated Convolution module 224cl may capture a broader feature context without significantly increasing the computational overhead. The SE Block module 224c2 may dynamically weigh the feature channels to emphasize important features specific to each key point. The Global Pooling (Mean and Max) module 224c3 may extract summary statistics of local features to achieve enhanced feature robustness. This separation among the independent key-point modules may ensure that each key point can be modeled distinctly, capturing its unique spatial and contextual patterns. The independent key-point modules 224c may also allow flexible modifications for features specific to different types of 3D objects beyond human bodies. In the example of FIG. 5, the front key-point estimation model 224 effectively combines local features from the independent key-point modules with the global context features to leverage both local and holistic information about the input 2D front-view image 104. The final coordinates of the 2D key points may be predicted using fully connected layers with a sigmoid activation which normalizes the coordinates to a range within [0,1] [0,1] [0,1]. The final layers of the 224 may then transform the coordinates of the 2D key points to 3D coordinates of the key points 126 in the 3D model 226. A dedicated branch (not illustrated) in the front key-point estimation model 224 may predict whether each key point is present using the global context features. This dedicated branch may ensure that the front key-point estimation model 224 can handle cases where certain key points might be occluded or not visible in the 2D front-view image 104.

In one example, the act 124 may include sub-acts 502 and 504. At the sub-act 502, in one example, the controller 202 inputs the 2D front-view image 104 into the third encoder 224a to execute the third encoder 224a for feature extraction. At the sub-act 504, in one example, after further executing the Global Context module 224b and one of the independent key-point modules 224c, the controller 202 outputs one or more key points 126 (depicted as "Front key point [s]" 126a, "Front key point [s]" 126b, "Front key point [s]" 126c, and others) as reference points for extracting the respective body measurement.

In certain examples, the side key-point estimation model 228 may have a similar machine-learning architecture as that of the front key-point estimation model 224.

Figure 6A:
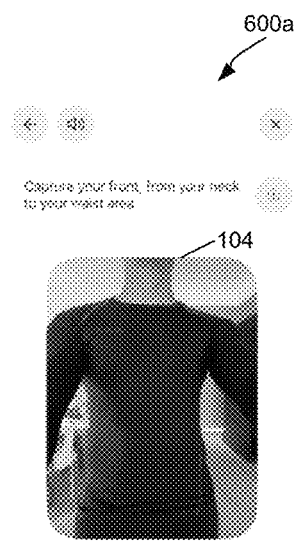
FIGS. 6A-6C illustrate a graphical user interface displaying a 2D front-view RGB image, a 2D side-view RGB image, and body measurement results, respectively, according to an example.
Figure 6B:
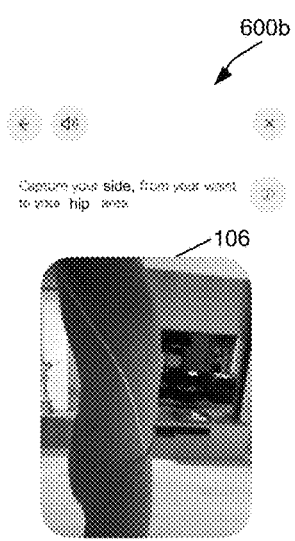
Figure 6C:
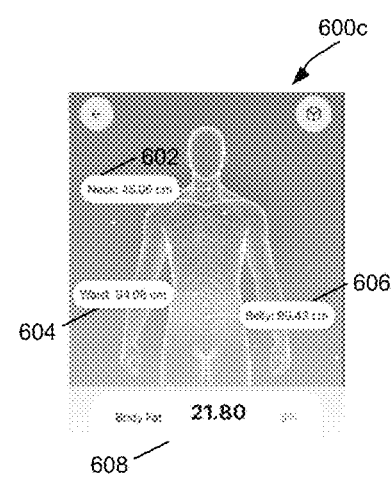

In one example, the controller 202 may control the user interface 204 to output or display information related to the body measurement of the user such as the 2D images 104, 106, the key points 126, 134, and the measurement results. In certain examples, the user interface 204 may include a graphical user interface (GUI) to allow intuitive user interaction. FIGS. 6A-6C illustrate a GUI 600 (depicted as GUI 600a, 600b, 600c) displaying a 2D front-view RGB image, a 2D side-view RGB image, and body measurement results, respectively, according to an example.

Referring to FIG. 6A, in one example, a GUI 600a may include instructions (for example, "Capture your front, from your neck to your waist area") to the user for capturing a 2D front-view image 104 with a camera 102. The GUI 600a may also include the captured 2D front-view image 104 from the camera 102. In other examples, the GUI 600a may include a live video feed of the user from the camera 102 which turns into the 2D front-view image 104 once the 2D front-view image 104 is captured.

Referring to FIG. 6B, in one example, a GUI 600b may include instructions (for example, "Capture your side, from your waist to your hip area") to the user for capturing a 2D side-view image 106 with the camera 102. The GUI 600b may also include the captured 2D side-view image 106 from the camera 102. In other examples, the GUI 600b may include a live video feed of the user from the camera 102 which turns into the 2D side-view image 106 once the 2D side-view image 106 is captured.

Referring to FIG. 6C, in one example, a GUI 600c may include a neck girth measurement result 602 ("Neck: 45.06 cm"), a waist girth measurement result 604 ("Waist: 94.08 cm), and a hip (or belly waist) girth measurement result 606 ("Belly: 99.43 cm"). The GUI 600c may also include a body fat estimation result 608. In one example, the body fact estimation result 608 is calculated using the U.S. Navy formula based on the body measurement results 602, 604, and 606.

In various examples, one or more of the machine-learning models 220, 222, 224, 228 described above may be slightly adjusted or extended to model the entire human body including the shoulders, the knees, the ankles, and other body parts. In other examples, one or more of the machine-learning models 220, 222, 224, 228 may be slightly adapted to model a 3D object of an arbitrary shape, such as a car, a furniture, an animal, and others by re-training on datasets specific to the category of the 3D object. In certain examples, one or more of the machine-learning models 220, 222, 224, 228 may use a different backbone model than those described above, such as UNet, VNet, Pyramid Attention Network, DepthNet, and Vision Transformers (ViT). In various examples, one or more of the machine-learning models 220, 222, 224, 228 may use a different loss function, such as L1 Loss, L2 Loss, L1 or L2 Loss combined with gradient Loss and Structural Similarity (SSIM) Loss, and any other loss functions tailored for 2D image depth prediction. Such adjustments or variations of the machine-learning models 220, 222, 224, 228 for 2D image depth estimation are within the scope of this disclosure.

The controller 202 may execute various operations discussed above. The controller 202 may also execute one or more instructions stored on one or more non-transitory computer-readable media. For example, the memory 206 and/or the external devices 210 may include or be coupled to the non-transitory computer-readable media which store instructions 214. The controller 202 may execute the instructions 214 to execute various operations discussed above, including the processes 100, 300, 400, and 500. In some examples, the controller 202 may include one or more processors or other types of controllers. In one example, the controller 202 is or includes at least one processor. In another example, the controller 202 performs at least a portion of the operations discussed above using an application-specific integrated circuit tailored to perform particular operations in addition to, or in lieu of, a processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

The user interface 204 may include one or more user inputs, one or more user outputs, or a combination thereof. The user interface 204 may include user-input devices such as a keyboard, a mouse, a touchscreen, and so forth. Users may use the user inputs to input information indicative of the user's body metrics. The user interface 204 may also include user-output devices such as a computer monitor, sound-emitting devices such as speakers or buzzers, light-emitting devices such as light-emitting diodes, and so forth. The user interface 204 may include one or more GUIs. Users may use the user outputs to receive various information related to body measurements.

The memory 206 may include non-transitory computer-readable media, such as memory devices (for example, read-only memory, random-access memory, and so forth) and/or storage devices (for example, hard drives, optical disks, and so forth).

The network interface 208 may include one or more devices or components to interface with external devices, such as the external devices 210. For example, the network interface 208 may include wired-communication components that enable wired communication (for example, wired-communication ports to receive a communication wire), wireless-communication components that enable wireless communication (for example, antennas), a combination thereof, and so forth.

The external devices 210 may include any devices or components which are physically external to the mobile device 101, such as external computing devices (for example, other mobile or non-mobile computing devices accessible by the user), cloud computers, servers, external data storage, and so forth. In certain examples, the external devices 210 may include one or more cameras and/or one or more sensors. In some examples, the external devices 210 may include devices substantially similar to the mobile device 101. For example, a user may have access to several mobile devices implemented as or including the mobile device 101, each of which may be networked together.

In various examples, the mobile device 101 may not include any external devices 210 and the controller 202 may execute the process 100 to perform body measurements of the user completely locally on the mobile device 101. Such complete local processing may be allowed because of the low computational overhead requirements of the machine-learning models 220, 222, 224, 228 of the process 100.

Aspects of the present disclosure may also include computer-readable media for carrying or having computer-executable instructions or data structures stored thereon. Such computer-readable media can be any available media that can be accessed by a special purpose computer or a mobile device and comprises computer storage media and communication media. By way of example, and not limitation, computer storage media include both volatile and nonvolatile, removable and non-removable media implemented in any method or technology for storage of information such as computer-readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired non-transitory information in the form of computer-executable instructions or data structures and that can be accessed by a computer. When information is transferred or provided over a network or another communications connection (either hardwired, wireless, or a combination of hardwired or wireless) to a computer or mobile device, the computer or mobile device properly views the connection as a computer-readable medium. Thus, any such connection is properly termed a computer-readable medium. Combinations of the above should also be included within the scope of computer-readable media. Computer-executable instructions comprise, for example, instructions and data which cause a general-purpose computer, special purpose computer, or special purpose mobile device to perform a certain function or group of functions.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. At least one non-transitory computer-readable medium storing thereon sequences of computer-executable instructions for measuring a human body based on two-dimensional (2D) digital images, the sequences of computer-executable instructions including instructions that instruct at least one processor to:
receive, from a camera, a 2D front-view digital image of the human body and a 2D side-view digital image of the human body;
receive one or more camera parameters;
execute a front depth-estimation model to convert the 2D front-view digital image into a front depth map and to convert the 2D side-view digital image into a side depth map, the front depth-estimation model generated through pre-training a first machine-learning model;
execute a rear depth-estimation model to estimate a rear depth map based on the 2D front-view digital image, the 2D side-view digital image, the front depth map, and the side depth map, the rear depth-estimation model generated through pre-training a second machine-learning model;
combine the front depth map with the rear depth map to generate a three-dimensional (3D) model of the human body;
execute a front key-point estimation model to estimate one or more front key points of the human body in the 3D model, the front key-point estimation model generated through pre-training a third machine-learning model; and
extract a measurement of the human body based on the 3D model and at least one of the one or more front key points, wherein
the first machine-learning model includes a first encoder and a first decoder, the first decoder configured to be executed based on at least one of the one or more camera parameters, and
the second machine-learning model includes a second encoder and a second decoder, the second decoder configured to be executed based on at least one of the one or more camera parameters.

2. The at least one non-transitory computer-readable medium of claim 1, wherein at least one of the 2D front-view digital image and the 2D side-view digital image is a Red-Green-Blue (RGB) image.

3. The at least one non-transitory computer-readable medium of claim 1, wherein at least one of the 2D front-view digital image and the 2D side-view digital image is a grayscale image.

4. The at least one non-transitory computer-readable medium of claim 1, wherein the one or more camera parameters include a focal length of the camera, a first plurality of camera orientation parameters associated with the 2D front-view digital image, and a second plurality of camera orientation parameters associated with the 2D side-view digital image.

5. The at least one non-transitory computer-readable medium of claim 4, wherein
the first decoder is configured to be executed based on the focal length of the camera and the first plurality of camera orientation parameters associated with the 2D front-view digital image; and
the second decoder is configured to be executed based on the focal length of the camera, the first plurality of camera orientation parameters associated with the 2D front-view digital image, and the second plurality of camera orientation parameters associated with the 2D side-view digital image.

6. The at least one non-transitory computer-readable medium of claim 4, wherein each plurality of the first plurality of camera orientation parameters and the second plurality of camera orientation parameters includes a first rotation angle with respect to a first axis in an image plane and a second rotation angle with respect to a second axis in the image plane, the second axis being perpendicular to the first axis.

7. The at least one non-transitory computer-readable medium of claim 1, wherein the instructions further instruct the at least one processor to control a user interface to provide the measurement of the human body to a user.

8. The at least one non-transitory computer-readable medium of claim 1, wherein the first encoder and the second encode are pre-trained based on a common backbone, the common backbone being one of a group including DenseNet, U-Net, V-Net, Pyramid Attention Network (PAN), DepthNet, and Vision Transformer (ViT).

9. The at least one non-transitory computer-readable medium of claim 1, wherein
the third machine-learning model includes a third encoder, a global context module, and a plurality of key-point modules; and
executing the front key-point estimation model to estimate the one or more front key points includes
executing the third encoder to extract a global feature based on the 2D RGB front-view image, the global feature represented by a plurality of spatial dimensions,
executing the global context module to convert the plurality of spatial dimensions of the global feature into a global feature vector, and
executing one of the plurality of key-point modules to process the global feature vector to estimate a front key point.

10. The at least one non-transitory computer-readable medium of claim 9, wherein the third encoder is pre-trained based on a MobileNet backbone.

11. The at least one non-transitory computer-readable medium of claim 10, wherein the plurality of key-point modules includes at least one of a group including a Dilated Convolution module, a Squeeze-and-Excitation (SE) Block module, and a Global Pooling (Mean and Max) module.

12. The at least one non-transitory computer-readable medium of claim 9, wherein the instructions further instruct the at least one processor to
execute a side key-point estimation model to estimate one or more side key points of the human body in the 3D model, the side key-point estimation model generated through pre-training the third machine-learning model, wherein executing the side key-point estimation model includes
executing the second encoder to extract a global feature based on the 2D side-view digital image, the global feature represented by a plurality of spatial dimensions,
executing the global context module to convert the plurality of spatial dimensions of the global feature into a global feature vector, and
executing one of the plurality of key-point modules to process the global feature vector to estimate a side key point.

13. The at least one non-transitory computer-readable medium of claim 1, wherein the measurement of the human body includes at least one of a group including a neck girth measurement, a waist girth measurement, a hip girth measurement, and a body composition measurement, the body composition measurement including a body fat measurement.

14. The at least one non-transitory computer-readable medium of claim 1, wherein the instructions further instruct the at least one processor to
receive an external depth map corresponding to the 2D front-view digital image from a sensor; and
in response to receiving the external depth map, update the front depth map through incorporating at least a portion of the external depth map into the front depth map.

15. The at least one non-transitory computer-readable medium of claim 1, wherein the camera is coupled to or a part of a mobile device, the mobile device including the at least one non-transitory computer-readable medium and the at least one processor.

16. At least one non-transitory computer-readable medium storing thereon sequences of computer-executable instructions for measuring a human body based on two-dimensional (2D) digital images, the sequences of computer-executable instructions including instructions that instruct at least one processor to:
receive, from a camera, a 2D front-view digital image of the human body and a 2D side-view digital image of the human body;
receive an external depth map corresponding to the 2D front-view digital image from a sensor;
receive one or more camera parameters;
execute a side depth-estimation model to convert the 2D side-view digital image into a side depth map, the side depth-estimation model generated through pre-training a first machine-learning model;
execute a rear depth-estimation model to estimate a rear depth map based on the 2D front-view digital image, the 2D side-view digital image, the external depth map, and the side depth map, the rear depth-estimation model generated through pre-training a second machine-learning model;
combine the external depth map and the rear depth map to generate a three-dimensional (3D) model of the human body;
execute a front key-point estimation model to estimate one or more front key points of the human body in the 3D model, the front key-point estimation model generated through pre-training a third machine-learning model; and
extract a measurement of the human body based on the 3D model and at least one of the one or more front key points, wherein
the first machine-learning model includes a first encoder and a first decoder, the first decoder configured to be executed based on the one or more camera parameters, and
the second machine-learning model includes a second encoder and a second decoder, the second decoder configured to be executed based on the one or more camera parameters.

17. The at least one non-transitory computer-readable medium of claim 16, wherein
the one or more camera parameters include a focal length of the camera, a first plurality of camera orientation parameters associated with the 2D front-view digital image, and a second plurality of camera orientation parameters associated with the 2D side-view digital image;
the first decoder is configured to be executed based on the focal length of the camera and the first plurality of camera orientation parameters associated with the 2D front-view digital image; and
the second decoder is configured to be executed based on the focal length of the camera, the first plurality of camera orientation parameters associated with the 2D front-view digital image, and the second plurality of camera orientation parameters associated with the 2D side-view digital image.

18. The at least one non-transitory computer-readable medium of claim 16, wherein the camera and the sensor are coupled to or parts of a mobile device, the mobile device including the at least one non-transitory computer-readable medium and the at least one processor.

19. A method of measuring a human body based on two-dimensional (2D) digital images, the method comprising:

receiving, from a camera, a 2D front-view digital image of the human body and a 2D side-view digital image of the human body;

receiving one or more camera parameters;

executing a front depth-estimation model to convert the 2D front-view digital image into a front depth map and to convert the 2D side-view digital image into a side depth map, the front depth-estimation model generated through pre-training a first machine-learning model;

executing a rear depth-estimation model to estimate a rear depth map based on the 2D front-view digital image, the 2D side-view digital image, the front depth map, and the side depth map, the rear depth-estimation model generated through pre-training a second machine-learning model;

combining the front depth map with the rear depth map to generate a three-dimensional (3D) model of the human body;

executing a front key-point estimation model to estimate one or more front key points of the human body in the 3D model, the front key-point estimation model generated through pre-training a third machine-learning model; and extracting a measurement of the human body based on the 3D model and at least one of the one or more front key points, wherein the first machine-learning model includes a first encoder and a first decoder, the first decoder configured to be executed based on the one or more camera parameters, and the second machine-learning model includes a second encoder and a second decoder, the second decoder configured to be executed based on the one or more camera parameters.

20. The method of claim 19, wherein the one or more camera parameters include a focal length of the camera, a first plurality of camera orientation parameters associated with the 2D front-view digital image, and a second plurality of camera orientation parameters associated with the 2D side-view digital image;

the first decoder is configured to be executed based on the focal length of the camera and the first plurality of camera orientation parameters associated with the 2D front-view digital image; and the second decoder is configured to be executed based on the focal length of the camera, the first plurality of camera orientation parameters associated with the 2D front-view digital image, and the second plurality of camera orientation parameters associated with the 2D side-view digital image.

* * * * *